(12) United States Patent
Kato et al.

(10) Patent No.: US 10,723,917 B2
(45) Date of Patent: Jul. 28, 2020

(54) ADHESIVE SHEET JOINING METHOD AND ADHESIVE SHEET JOINING APPARATUS

(71) Applicant: NITTO DENKO CORPORATION, Ibaraki-shi, Osaka (JP)

(72) Inventors: Masakazu Kato, Ibaraki (JP); Osamu Degawa, Ibaraki (JP); Yasuhiko Kawaguchi, Ibaraki (JP)

(73) Assignee: NITTO DENKO CORPORATION, Ibaraski-shi, Osaka (JP)

( * ) Notice: Subject to any disclaimer, the term of this patent is extended or adjusted under 35 U.S.C. 154(b) by 26 days.

(21) Appl. No.: 15/778,299

(22) PCT Filed: Oct. 26, 2016

(86) PCT No.: PCT/JP2016/081749
§ 371 (c)(1),
(2) Date: May 23, 2018

(87) PCT Pub. No.: WO2017/090369
PCT Pub. Date: Jun. 1, 2017

(65) Prior Publication Data
US 2018/0340096 A1 Nov. 29, 2018

(30) Foreign Application Priority Data

Nov. 24, 2015 (JP) .................................. 2015-228673
Oct. 19, 2016 (JP) .................................. 2016-205179

(51) Int. Cl.
*B29C 65/00* (2006.01)
*C09J 5/00* (2006.01)
(Continued)

(52) U.S. Cl.
CPC ............... *C09J 5/00* (2013.01); *B05C 5/0254* (2013.01); *B05C 11/025* (2013.01); *B05C 19/04* (2013.01);
(Continued)

(58) Field of Classification Search
CPC ............ B32B 37/1284; B32B 37/1292; B32B 37/153; B29C 65/40; B29C 65/41;
(Continued)

(56) References Cited

U.S. PATENT DOCUMENTS 3,914,484 A * 10/1975 Creegan ................. C09J 175/04
428/41.5
4,256,526 A * 3/1981 McDaniel ............. B65B 51/023
118/313
(Continued)

FOREIGN PATENT DOCUMENTS

| EP | 1 531 040 A2 | 5/2005 |
|---|---|---|
| JP | 10-110541 A | 4/1998 |
| JP | 2003-253219 A | 9/2003 |
| JP | 2005-139218 A | 6/2005 |
| JP | 2012-245512 A | 12/2012 |
| JP | 2015-178229 A | 10/2015 |

OTHER PUBLICATIONS

Extended European Search Report dated Jul. 19, 2019 from European Patent Office in counterpart EP Application No. 16868318.3.

*Primary Examiner* — Mark A Osele
*Assistant Examiner* — Nickolas R Harm
(74) *Attorney, Agent, or Firm* — Sughrue Mion, PLLC

(57) ABSTRACT

A die coater 10 as a coating member directly applies an adhesive resin G to a joining portion of a workpiece W by a predetermined width while a holding table 1 holding the workpiece W placed thereon moves. A reinforcing substrate T supplied from an original master roll is joined to the resin G applied to the workpiece W while being pressed by a joining roller 15, and the reinforcing substrate T is cut by a predetermined length. That is, an adhesive sheet is directly formed on the workpiece W.

17 Claims, 9 Drawing Sheets

(51) Int. Cl.

| | | |
|---|---|---|
| *C09J 201/00* | (2006.01) | |
| *C08L 101/00* | (2006.01) | |
| *B32B 5/24* | (2006.01) | |
| *B32B 15/08* | (2006.01) | |
| *C09J 7/38* | (2018.01) | |
| *B05C 5/02* | (2006.01) | |
| *B05C 11/02* | (2006.01) | |
| *B05C 19/04* | (2006.01) | |
| *B29C 65/48* | (2006.01) | |
| *B32B 37/12* | (2006.01) | |
| *B29C 65/52* | (2006.01) | |
| *B29C 65/78* | (2006.01) | |
| *B32B 37/15* | (2006.01) | |

(52) U.S. Cl.
CPC ............... *B32B 5/24* (2013.01); *B32B 15/08* (2013.01); *C08L 101/00* (2013.01); *C09J 7/38* (2018.01); *C09J 201/00* (2013.01); *B29C 65/4825* (2013.01); *B29C 65/522* (2013.01); *B29C 65/524* (2013.01); *B29C 65/7861* (2013.01); *B29C 66/472* (2013.01); *B29C 66/4722* (2013.01); *B32B 37/1292* (2013.01); *B32B 37/153* (2013.01); *C09J 2205/10* (2013.01); *C09J 2205/30* (2013.01)

(58) Field of Classification Search
CPC ... B29C 65/43; B29C 65/4825; B29C 65/522; B29C 65/524; B29C 65/525; B29C 65/7861; B29C 66/472; B29C 66/4722; C09J 7/10; C09J 5/00; C09J 5/02
USPC ... 156/242, 244.11, 297, 300, 302, 303, 543
See application file for complete search history.

(56) References Cited

U.S. PATENT DOCUMENTS

| | | | | |
|---|---|---|---|---|
| 5,279,684 | A * | 1/1994 | Retti | E04F 21/00 156/280 |
| 5,624,737 | A * | 4/1997 | Fairbanks | B29C 66/73111 428/198 |
| 5,938,648 | A * | 8/1999 | LaVon | A61F 13/15203 604/358 |
| 6,065,701 | A * | 5/2000 | Tanimura | G11B 23/08714 242/344 |
| 2001/0031146 | A1* | 10/2001 | Thering | G03D 5/006 396/604 |
| 2005/0103422 | A1 | 5/2005 | Kawaguchi | |
| 2006/0000544 | A1* | 1/2006 | Hunter | B31B 50/00 156/244.11 |
| 2007/0169887 | A1* | 7/2007 | Kanagawa | D06N 3/0063 156/331.7 |
| 2008/0153377 | A1* | 6/2008 | Kobayashi | G02F 1/133308 445/24 |
| 2009/0067798 | A1* | 3/2009 | Hikita | G02B 6/12 385/131 |
| 2010/0002183 | A1* | 1/2010 | Fukuda | G02F 1/1303 349/158 |
| 2012/0305168 | A1* | 12/2012 | Schmid | B27D 5/003 156/73.1 |
| 2013/0153116 | A1* | 6/2013 | Hirakawa | H01L 21/67092 156/64 |
| 2015/0064441 | A1* | 3/2015 | Monolo | C08G 18/089 428/317.7 |
| 2015/0251397 | A1* | 9/2015 | Lee | B32B 15/08 428/141 |
| 2017/0095969 | A1 | 4/2017 | Degawa et al. | |

* cited by examiner

ADHESIVE SHEET JOINING METHOD AND ADHESIVE SHEET JOINING APPARATUS

CROSS REFERENCE TO RELATED APPLICATIONS

This application is a National Stage of International Application No. PCT/JP2016/081749, filed Oct. 26, 2016, claiming priorities based on Japanese Patent Application Nos. 2015-228673, filed Nov. 24, 2015 and 2016-205179, filed Oct. 19, 2016.

TECHNICAL FIELD

The present invention relates to a method and an apparatus of joining adhesive sheets to steel plates of transport machinery including automobiles and various industrial machinery for reinforcement or vibration suppression.

BACKGROUND ART

In recent years, there has been a tendency toward thinner steel plates in order to reduce weights of vehicles like automobiles. Such a tendency for thinning is accompanied by lower rigidity of steel plates. Thinned steel plates are more liable to transmit unevenness of traveling surfaces as well as vibration and noise of engines. Under the circumstances, a proposal has been made to employ resin sheets to compensate for the rigidity of steel plates or resin sheets to damp vibration or the like (see, for example, Patent Literature 1).

Another proposal has also been made to employ an apparatus for stripping off release paper attached to an adhesive sheet having a reinforcing resin layers and for automatically joining the adhesive sheet to a lateral outside plate of an automobile such as an engine hood and a door. Such an apparatus joins the adhesive sheet as follows.

A transport mechanism of a robot suction-holds and places the adhesive sheet having a predetermined shape on a carrier plate. The transport mechanism sandwiches the adhesive sheet with the carrier plate. A separator, which is larger than the adhesive sheet, protrudes from the carrier plate. Accordingly, the separator is gripped by paired movable pieces provided with a stripping unit. Under such a condition, the separator is stripped from the resin layer while arms of the stripping unit swing downwardly. In synchronization with this stripping, the adhesive sheet suction-held by the transport mechanism is moved horizontally toward the exterior of the carrier plate. The adhesive sheet having the separator stripped off is transported to a workpiece, and the adhesive sheet is joined to the workpiece with a brush roller (see, for example, Patent Literature 2).

[Patent Literature 1] Japanese Unexamined Patent Publication No. 2005-139218A

[Patent Literature 2] Japanese Patent Application No. 2014-056587

SUMMARY OF INVENTION

Technical Problem

The adhesive sheet having the resin layer for reinforcing the outside plate has a predetermined thickness and hardness. Consequently, it is hard to bend the adhesive sheet. In addition, it is difficult to join the adhesive sheet along a curved surface of the outside plate. Moreover, some inconvenience may arise that the adhesive sheet having a predetermined length is hard to be subjected to handling.

Another inconvenience as follows may arise. That is, the adhesive sheet need to be stored and controlled for each workpiece. This is because the adhesive sheet has to be pre-cut in a predetermined shape so as to conform to a shape of the workpiece to be joined.

The present invention has been made regarding the state of the art noted above, and its primary object is to provide an adhesive sheet joining method and an adhesive sheet joining apparatus that achieve easy handling as well as easy storage and control of an adhesive sheet when the adhesive sheet is joined to a workpiece and that allow accurate joining of the adhesive sheet to the workpiece.

Solution to Problem

The present invention is constituted as stated below to achieve the above object.

An adhesive sheet joining method for joining an adhesive sheet to a workpiece. The method includes: a coating step of applying an adhesive resin having a predetermined width to the workpiece by a coating member; and a joining step of joining a reinforcing substrate to the resin applied to the workpiece by a joining member to form the adhesive sheet.

Effect

With the method mentioned above, the resin is directly applied to the workpiece, and thereafter, the reinforcing substrate is joined to the resin to form the adhesive sheet. This brings the resin into tight adhesion to the workpiece regardless of a surface condition of the workpiece. In other words, there is no need to pre-cut the adhesive sheet into a predetermined shape in accordance with a position where the workpiece is joined. Moreover, easy handling is obtainable. In addition, the resin itself is kept stored inside a container, leading to easy control thereof.

The substrate is joined to the resin in the method noted above in the following manner when the substrate is a single strip substrate or plural strip substrates having a width smaller than a width of the resin.

In the joining step, a single strip substrate or plural strip substrates having a width smaller than the width of the resin are joined to the resin by a joining roller as the joining member.

Moreover, in the joining step, a single strip substrate or plural strip substrates having a width smaller than the width are placed on the resin, and a nozzle as the joining member sprays gas to the substrate or the substrates to join the substrate or the substrates to the resin.

With the method mentioned above, a contact area between the substrates and the resin is smaller than that when the resin is entirely covered with the substrate. As a result, air bubbles are unlikely to be caught onto an adhesive interface between the resin and the substrate. Even if some air bubbles are caught, pressing the substrate leads to easy removal of the air bubbles from the adhesive interface. Consequently, the substrate tightly adheres to the resin. This prevents poor adhesion of the substrate during a heat treatment caused by expansion of the air bubbles on the adhesive interface.

The joining step in the method mentioned above may include transporting the substrate pre-cut by a length of the resin and joining the substrate to the resin applied to the workpiece.

The coating step in the method mentioned above may include blowing the resin having the predetermined width from a nozzle as a coating member to apply the resin to the workpiece. With such a configuration, a position of the nozzle, a distance from the nozzle to the workpiece, and a coating amount of the resin are adjustable appropriately in order to obtain an even thickness of the resin blown to the workpiece through the nozzle. As a result, the resin on the adhesive sheet is suitably adjustable in shape more easily.

In the method mentioned above, when the substrate is roving substrates, the substrates are joined to the resin in the following manner.

That is, in the joining step, roving substrates placed on the resin at given intervals are joined to the resin while the joining roller presses the substrates.

Alternatively, in the joining step, the roving substrates placed on the resin at given intervals are joined to the resin while the nozzle sprays gas.

With the method mentioned above, a contact area between the substrates and the resin is smaller than that when the resin is entirely covered with the substrate. This prevents air bubbles from being caught onto adhesive interfaces of the resin. Even if some air bubbles are caught, pressing the substrates leads to reliable removal of the air bubbles from the adhesive interfaces. Consequently, the substrate tightly adheres to the resin. This prevents poor adhesion of the substrate during a heat treatment caused by expansion of the air bubbles on the adhesive interface.

Moreover, it is preferred that a thickness of the resin applied to the workpiece is adjusted to form a plurality of recesses in a coating direction in the coating step, and that the substrate is placed on the recesses formed on a surface of the resin to join the substrate to the resin in the joining step.

With the method mentioned above, successive asperities are formed on the surface of the resin, leading to enhanced strength of the resin against bending stress. In addition, the recesses are able to be disposed over the substrate uniformly, causing the entire surface of the resin to be reinforced uniformly.

Moreover, the present invention is constituted as stated below to achieve the above object.

An adhesive sheet joining apparatus for joining an adhesive sheet to a workpiece. The apparatus includes a holding table supporting the workpiece placed thereon; a coating mechanism applying an adhesive resin having a predetermined width to the workpiece by a coating member; a substrate supplying unit supplying a reinforcing substrate whose width is smaller than the width of the resin applied to the workpiece; and a joining mechanism joining while pressing the substrate to the resin by a joining member.

Effect

With the configuration mentioned above, the coating mechanism applies the resin to the workpiece, and thereafter, the joining mechanism joins the substrate, fed from the substrate supplying unit, to the resin. In other words, the adhesive sheet is directly formable on a joining portion of the workpiece. Therefore, the resin is able to adhere to the workpiece tightly and is able to be handled easily. Thus, the above-noted method is performable effectively.

In the above configuration, it is preferred that the apparatus further includes an additional holding table that holds the workpiece placed thereon.

In the above configuration, when the substrate supplying unit supplies a single substrate or plural substrates, the joining roller or the nozzle may be used as the joining member, for example.

When the joining member is the joining roller and the plural roving substrates are used, it is preferred that plural guide grooves are provided on a peripheral side face of the joining member for pressing and joining the substrates to the resin while guiding the substrates.

The following is more preferred. That is, the apparatus further includes a controller. The controller forms a plurality of recesses on a surface of the resin in the coating direction while controlling an amount of the resin to be applied from the coating member in a width direction of the workpiece on a coating line. The joining roller includes guide grooves on a peripheral side face thereof for inserting and pressing the roving substrates into and against the recesses on the surface of the resin while guiding the substrates.

With the configuration mentioned above, a contact area between the substrates and the resin is smaller than that when the resin is entirely covered with the substrate. This prevents air bubbles from being caught onto an adhesive interface of the resin. In addition, this achieves easy pressing of the caught air bubbles and removal of the air bubbles from the adhesive interface. Therefore, the substrates are able to adhere to the resin tightly. Moreover, when the controller controls the coating amount of the resin, the surface of the resin with the recesses formed thereon achieves successive asperities on the surface of the resin to obtain enhanced strength of the resin. In addition, the substrates are inserted into the recesses to be pressed, causing the uniform reinforcement of the resin.

When the joining member is a nozzle, the nozzle joins the single substrate or plural substrates, supplied from the substrate supplying unit, to the resin while spraying gas to the substrate/substrates.

In the configuration mentioned above, the substrate supplying unit may transport substrates, each pre-cut by the length of the resin, to the resin applied to the workpiece.

When the substrates are plural roving substrates, it is preferred that the joining member further includes a guide roller for placing the substrates on the resin while guiding the substrates on the plural guide grooves formed on a peripheral side face of the joining member.

The following is also preferred. That is, the apparatus further includes a controller. The controller forms plural recesses on a surface of the resin in the coating direction while controlling an amount of the resin to be applied from the coating member in a width direction of the workpiece on a coating line. The guide roller guides the roving substrates into the recesses on the surface of the resin.

With the configuration mentioned above, a contact area between the substrates and the resin is smaller than that when the resin is entirely covered with the substrate. This prevents air bubbles from being caught onto an adhesive interface of the resin. In addition, this achieves easy pressing of the caught air bubbles and removal of the air bubbles from the adhesive interface. Therefore, the substrates are able to adhere to the resin tightly. Moreover, when the controller controls the coating amount of the resin, the surface of the resin with the recesses formed thereon achieves successive asperities on the surface of the resin to obtain enhanced strength of the resin. In addition, the substrates are inserted into the recesses to be pressed, causing the uniform reinforcement of the resin.

In the configuration mentioned above, a die coater may be employed as the coating member to apply the resin from a slit to the workpiece by a predetermined width.

In the configuration mentioned above, a nozzle may be employed as the coating member to apply the resin from a slit to the workpiece by a predetermined width. With such a configuration, a position of the nozzle, a distance from the nozzle to the workpiece, and a coating amount of the resin are adjustable appropriately in order to obtain an even thickness of the resin blown to the workpiece through the nozzle. As a result, the resin of the adhesive sheet is suitably adjustable in shape more easily and more suitably Advantageous Effects of Invention With the method and the apparatus for joining the adhesive sheet according to the present invention, easy handling as well as easy storage and control is obtainable when the adhesive sheet is joined to the workpiece. In addition, the adhesive sheet is able to be joined to the workpiece accurately.

DESCRIPTION OF EMBODIMENTS

The following describes one non-limiting embodiment of the present invention with reference to drawings.

Figure 1:
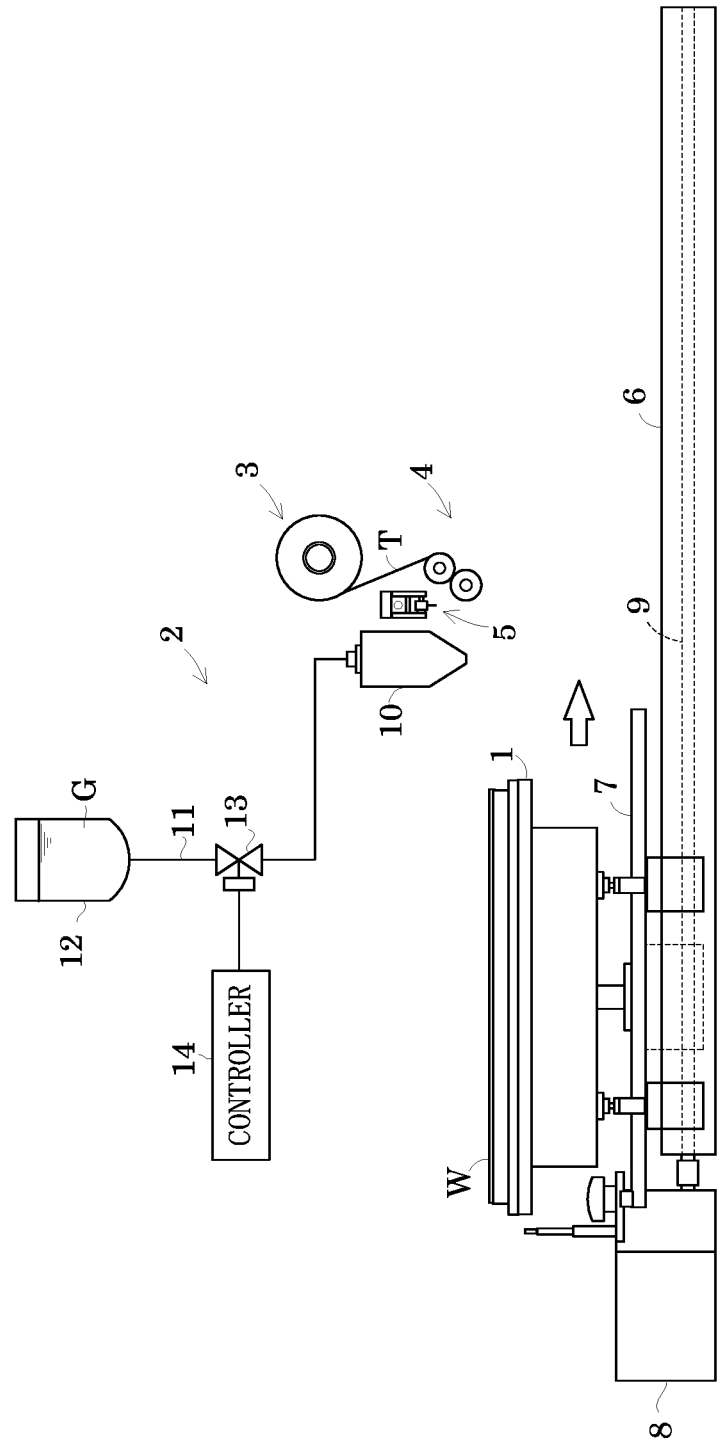
FIG. 1 is a plan view of an adhesive sheet joining apparatus according to one embodiment.
Figure 2:
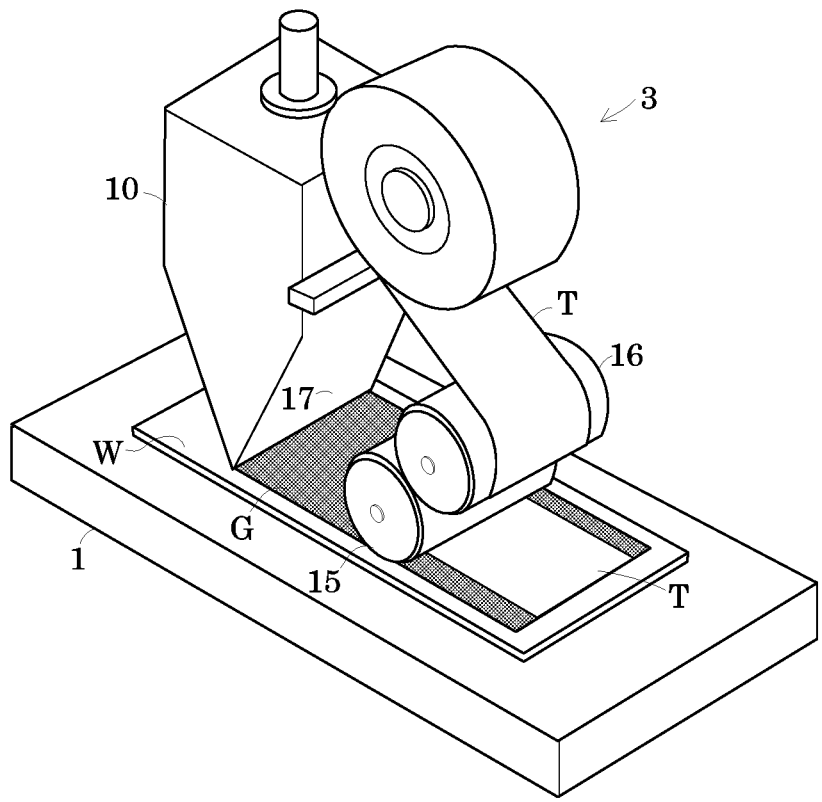
FIG. 2 is a perspective view of the adhesive sheet joining apparatus.

FIG. 1 is a plan view of an adhesive sheet joining apparatus. FIG. 2 is perspective view of the adhesive sheet joining apparatus.

The adhesive sheet joining apparatus includes a holding table 1, a coating mechanism 2, a substrate supplying unit 3, a joining mechanism 4, and a cutting mechanism 5, as illustrated in FIGS. 1 and 2.

The holding table 1 holds an outside plate such as an engine hood and a door of an automobile. The holding table 1 is also supported on a movable board 7. The movable board 7 is slidable forwardly/backwardly along a pair of right and left rails 6 disposed longitudinally and horizontally. The movable board 7 is driven by a screw shaft 9 in a screw feed manner. The screw shaft 9 rotates forwardly/backwardly with a pulse motor 8.

The coating mechanism 2 includes a reservoir 12. The reservoir 12 is in fluid communication with a die coater 10 via a channel 11 externally. The die coater 10 includes a slit supply port whose diameter is larger than a width of a joining portion of a workpiece W. In addition, the channel 11 has an electromagnetic valve 13 disposed therethrough. The electromagnetic valve 13 opens/closes by a controller 14. The reservoir 12 stores a resin G with a predetermined viscosity.

The substrate supplying unit 3 supplies a strip substrate T from a supply bobbin to the joining mechanism 4. The strip substrate T is pre-cut by a width equal to or smaller than the width of the joining portion of the workpiece W. The pre-cut substrate T is wounded to form an original master roll. The original master roll is loaded in the supply bobbin. The supply bobbin is coupled in synchronization with an electromagnetic brake, thereby being subjected to moderate rotational resistance. Consequently, this avoids excess feeding of the substrate T from the supply bobbin.

The joining mechanism 4 includes a joining roller 15 and a nip roller 16. The joining roller 15 is movable upwardly/downwardly by an actuator such as a cylinder. The joining roller 15 is in fluid communication with an external vacuum device so as to suction-hold the substrate T.

The nip roller 16 moves upwardly downwardly, thereby adjusting a gap to the joining roller 15.

The cutting mechanism 5 cuts the substrate T nipped by the joining roller 15 and the nip roller 16 with a cutter 17. That is, the cutting mechanism 5 causes the cutter 17 to move upwardly/downwardly between a piercing position where the substrate wounded around the joining roller is pierced and a standby position above the piercing position. In addition, the cutting mechanism 5 causes the cutter 17 to move horizontally along a rotary shaft of the joining roller 15.

The apparatus according to the embodiment is configured as follows. A series of operation by the exemplified apparatus is now to be described along with FIGS. 3 to 6.

Figure 3:
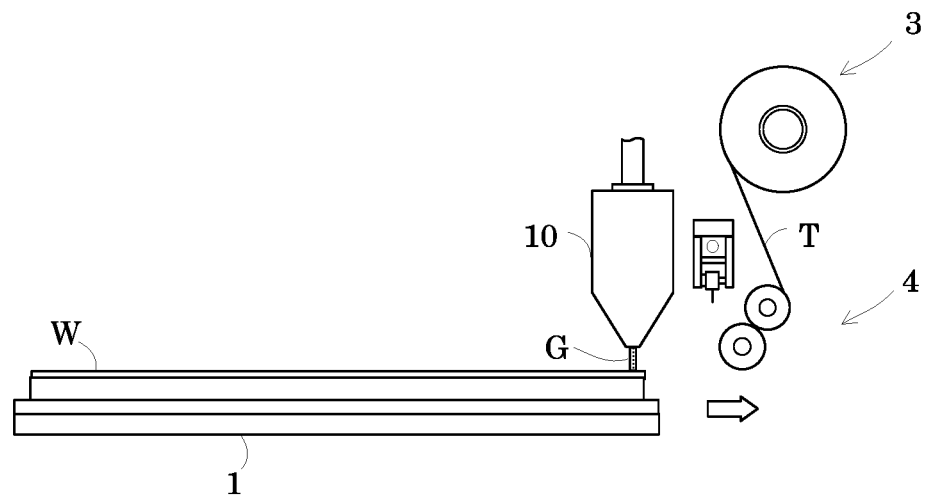
FIGS. 3 to 6 are each a front view of the adhesive sheet joining apparatus in operation of joining an adhesive sheet.

When the workpiece W is placed on the holding table 1, the holding table 1 is moved below the die coater 10 at a coating position of the resin G as illustrated in FIG. 3. The controller 14 causes the electromagnetic valve 13 to open for starting application of the resin G from the die coater 10 to the workpiece W. Here, a coating amount of the resin from the die coater 10 and a moving speed of the holding table 1 are pre-set in accordance with experiments or simulations such that the resin G applied to the workpiece W has a predetermined thickness.

Figure 4:
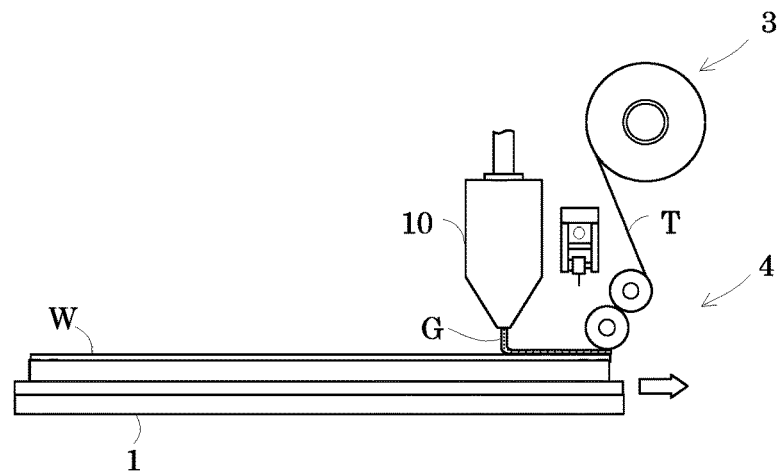
Figure 5:
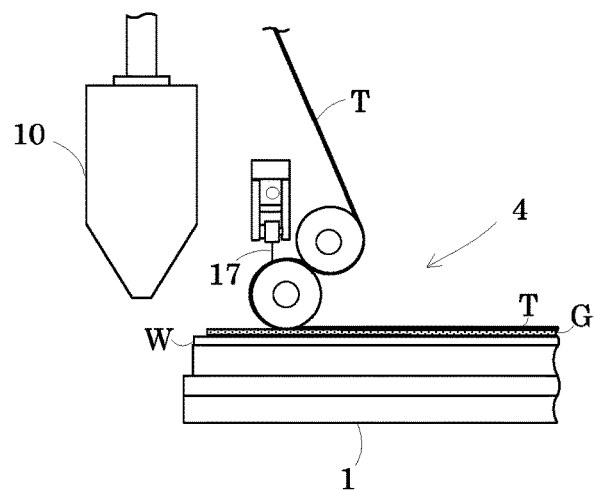

As illustrated in FIG. 4, along with start of the application of the resin G, the holding table 1 is moved by a predetermined distance, and then the joining roller 15 is moved downwardly. The joining roller 15 joins the substrate T from a front portion of the substrate T with the resin G applied thereto by a predetermined pressing force while moving in synchronization with a moving speed of the holding table 1.

When a tip end of the die coater 10 reaches a terminal position of the joining portion, the die coater 10 stops application of the resin G, and the holding table 1 stops moving.

Figure 6:
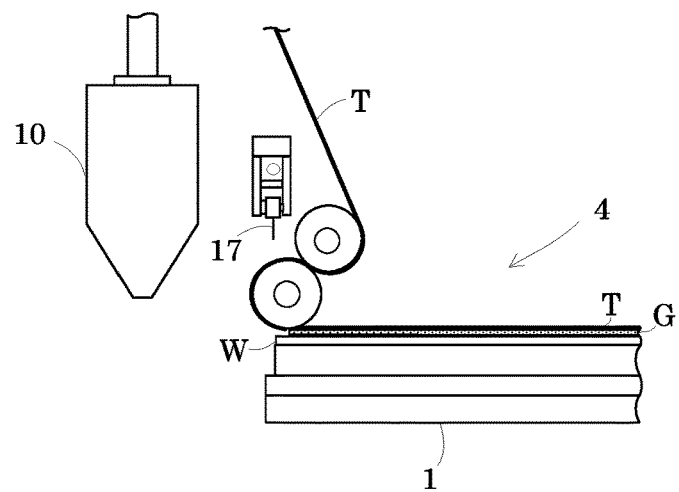

Then the cutter 17 of the cutting mechanism 5 is moved downwardly. The cutter 17 pierces the substrate T on the joining roller 15 in a rotary axis direction (i.e. a width direction of the substrate) to cut off the substrate T while moving horizontally. The substrate T is cut off on the joining roller by a length such that a rear end of the cut-off substrate T matches a rear end portion of the resin G. Accordingly, after the substrate T is cut off, the holding table 1 is again moved as illustrated in FIG. 6 to cause a rear portion of the substrate T not adhered yet is joined to the resin G.

Since a front end of the substrate is suction-held with the joining roller 15, the front end has already reached a lower end of the joining roller 15. At this time, the supplying unit 3 feeds out the substrate T by a predetermined length while exerting certain tension to the substrate T.

A series of joining the adhesive sheet to the joining portion of the workpiece W with the above-mentioned exemplified apparatus is completed in the manner as above. Such operation is performed repeatedly.

With the exemplified apparatus mentioned above, the resin G is directly applied to the joining portion of the adhesive sheet of the workpiece W. This achieves tight adhesion of the resin to the workpiece W reliably. Moreover, after the resin G is applied, the reinforcing substrate T is joined to the resin G to form the adhesive sheet. Consequently, this leads to easier handling than the case where the adhesive sheet pre-cut in a given shape is joined to the workpiece W. Moreover, there is no need to prepare various adhesive sheets for different shapes and types of the workpiece W. That is, the strip substrate T equal in shape to the resin G is usable. This achieves easy storage and control of the resin G and the substrate T.

The present invention may be embodied as the following aspects.

(1) In the exemplified apparatus mentioned above, the substrate whose width is substantially equal to that of the resin G applied to the joining portion of the workpiece W is joined to the resin G. However, the plural substrates each having a smaller width than the width of the applied resin G may be joined to the resin G.

Figure 7:
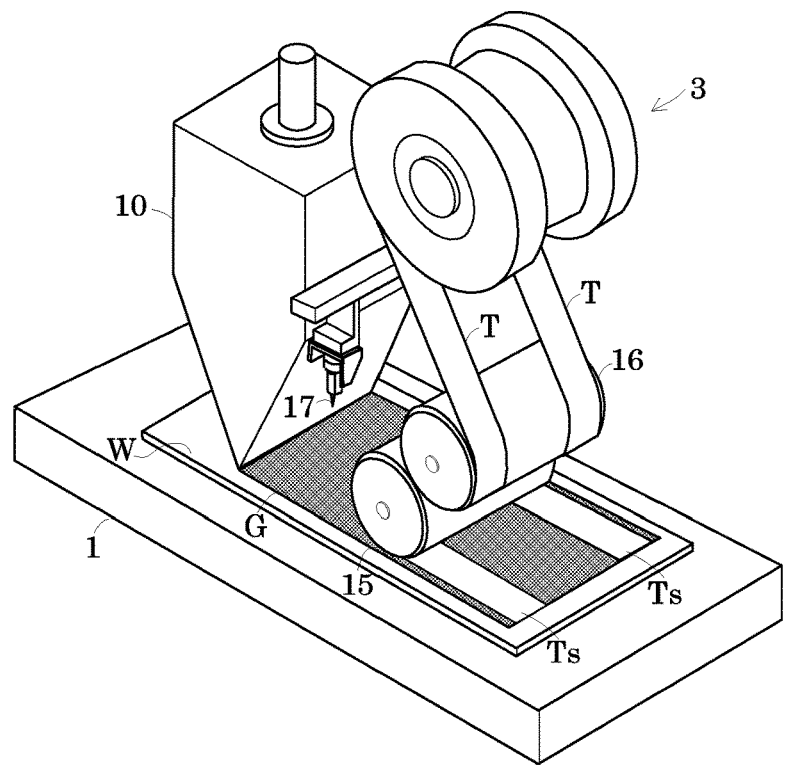
FIGS. 7 and 8 are each a perspective view of an adhesive sheet joining apparatus according to one modification.

For instance, as illustrated in FIG. 7, the exemplified apparatus is configured as follows. The supply bobbin having plural strip substrates Ts wounded therearound is loaded in the substrate supplying unit 3. The substrates Ts each have a smaller width than the coating width of the resin G. The substrates Ts are joined in parallel to the resin G at given intervals. In this embodiment, two substrates Ts are joined to the resin G. However, the number of substrates is not limited to two. That is, the number of substrates is appropriately set in accordance with the thickness and the width of the resin G as well as properties of the resin G and the substrates Ts. In addition, the plural substrates Ts are not necessarily disposed in parallel. That is, the plural substrates Ts may extend in an intersecting manner. In addition, the plural substrates Ts are not necessarily disposed at equal intervals. That is, the substrates Ts may be disposed at different intervals.

(2) The roving substrate may be used as reinforcement in another embodiment of the present invention. That is, a chopped fiber bundle is twisted and wounded around the supply bobbin to obtain a roving R. The roving R is used as the substrate. As the roving R, continuous glass fiber reinforced polypropylene is used, for example, that is obtained by bundling glass filaments with a binder.

Figure 8:
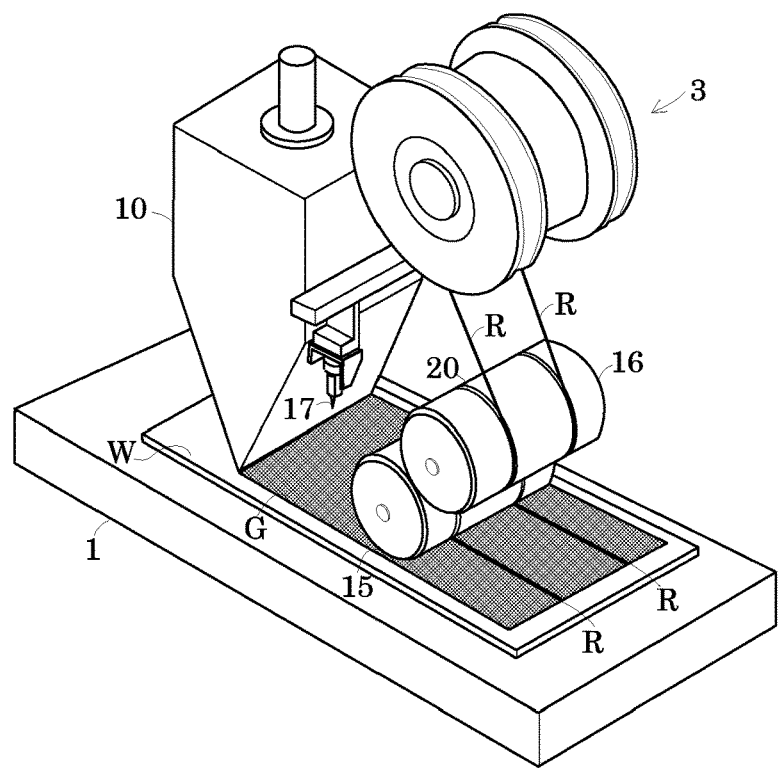

When the roving R is used, plural supply bobbins are set at given intervals in the substrate supplying unit 3 as illustrated in FIG. 8. The substrate supplying unit 3 feeds out rovings R and guides the rovings R into guide grooves 20, respectively, formed on peripheral side faces of the joining roller 15 and the nip roller 16.

Figure 9:
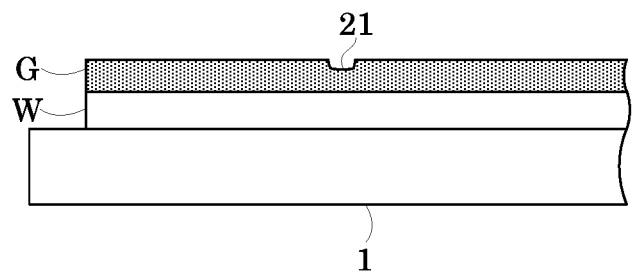
FIG. 9 illustrates joining of a roving to a resin with the modified apparatus in FIG. 10 illustrates another modification of the modified apparatus in FIG. 8.
Figure 10:
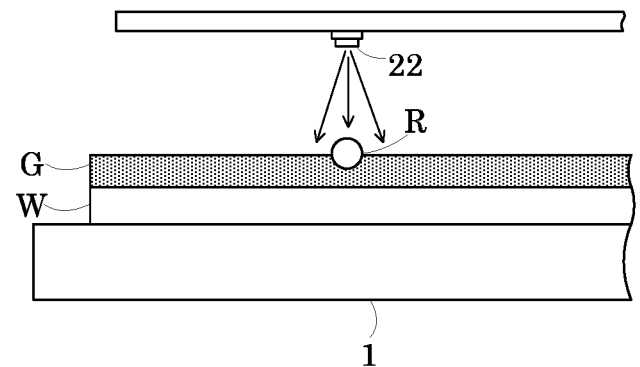

The following is applicable in use of the rovings R. Specifically, the coating amount of the resin G applied from the die coater 10 is adjusted every given interval in the width direction, whereby the thickness of the resin G is varied. That is, as illustrated in FIG. 9, recesses 21 are formed on the surface of the resin at given intervals. Thereafter, the joining roller 15 inserts the rovings R into the recesses 21, respectively, to press the rovings R against the recesses 21. Alternatively, in order to cause the rovings R to adhere tightly to the resin G reliably, the following configuration as illustrated in FIG. 10 is adoptable. That is, the nozzle 22 disposed downstream of the joining roller 15 sprays gas to a surface of the substrate for pressing the rovings R against the resin G again.

With the configuration in which the strip substrates Ts and the rovings R are joined to the resin G, a contact area between the substrates and the resin is smaller than that when the resin is entirely covered with the substrate T. This prevents air bubbles from being caught onto adhesive interfaces between the substrates Ts and the resin G or adhesive interfaces between the rovings R and the resin G. Even when some air bubbles are caught on the adhesive interfaces, the air bubbles are pressed out of the adhesive interfaces by a short distance. This leads to easy removal of the air bubbles from the adhesive interfaces. Therefore, the adhesive sheet is reliably formable having no air bubble caught onto the joining portions of the workpiece W.

Figure 11:
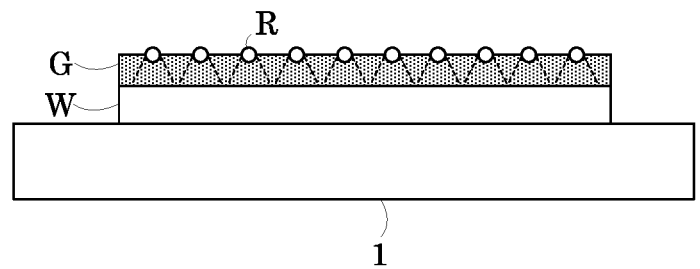
FIG. 11 is a longitudinal sectional view in which roving s are joined to the resin.

In addition, even in the case like the rovings R of a very small contact area to the resin, sufficient rigidity is obtainable at which the workpiece W subjected to bending stress is not bent. Specifically, shear stress acts on the adhesive interface between the adhesive sheet and the workpiece by the bending stress. As illustrated in FIG. 11, the shear stress is absorbed in the resin G as to spread radially from an adhesive face (curved face) of the roving R to the adhesive interface between the workpiece W and the resin G. Here, the adhesive face is embedded by approximately one-half thereof into the resin G. Since the shear stress exerted on the adhesive interface between the workpiece W and the resin G is absorbed by the resin G, the thickness, the number, and the property of the roving R as well as the thickness and the property of the resin G are variable appropriately.

Figure 12:
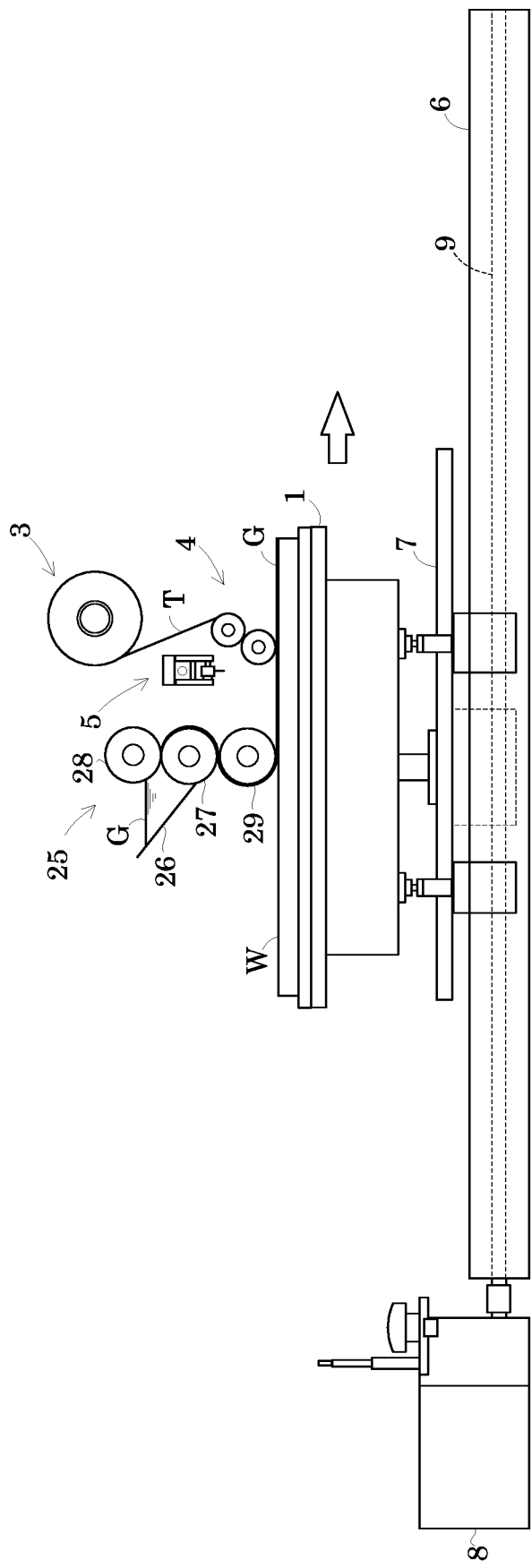
FIG. 12 is a front view of the other modified apparatus.

(3) In the embodiment mentioned above, the die coater 10 is used as the coating mechanism 2. Alternatively, a comma coater 25 as in FIG. 12 is usable, for example. In this configuration, the following is performed. Firstly, a gap between a coating roll 27 and a comma roll 28 each disposed adjacent to the reservoir 26 is adjusted for setting a thickness of the resin G to be fed from the reservoir 26. Then the resin G is passed between the coating roll 27 and the joining roller 29 to be joined to the workpiece W. Thereafter, the substrate T is applied to the resin to form an adhesive sheet at the joining portion of the workpiece W.

In another embodiment, it is preferred that a spray nozzle, instead of the die coater 10, sprays the resin G to the joining portion of the workpiece W to form a resin layer with a predetermined thickness. Here, a plurality of spray nozzles may be disposed on a resin supplying pipe at given intervals. The resin supplying pipe extends in the width direction of the resin G. Specifically, in order to obtain a uniform thickness of the resin G sprayed through the spray nozzles to the workpiece W in mist shape, a gap between adjacent spray nozzles, a distance from the nozzles to the workpiece W, and a coating amount of the resin G are adjustable appropriately.

(4) In the embodiment mentioned above, the supply bobbin supplies the strip or roving substrates. However, the joining robot may transport and join the substrates, pre-cut by the length of the resin, to the resin applied to the workpiece.

Figure 13:
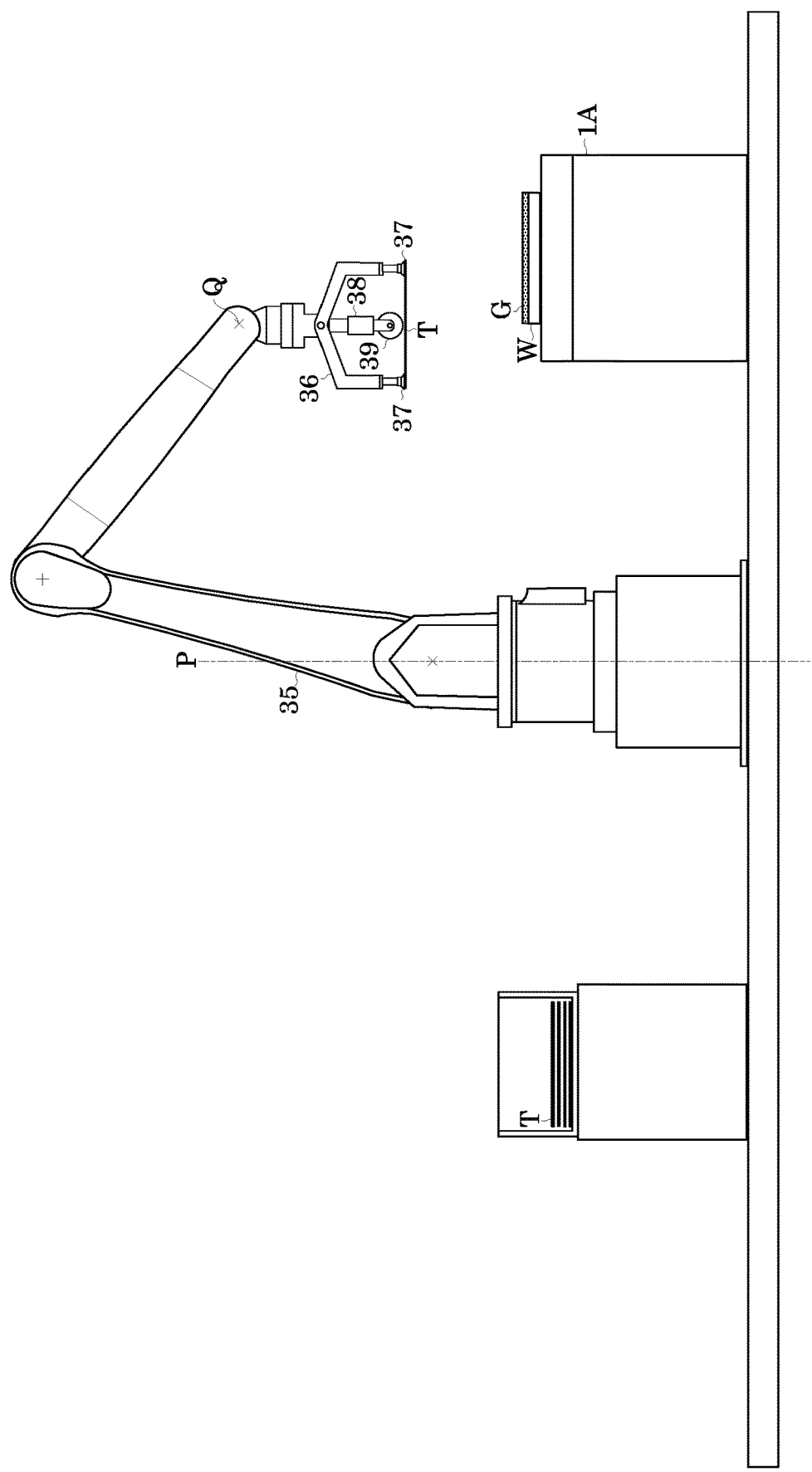
FIG. 13 is a front view of a joining robot according to the other modification.

The joining robot may be configured, for example, as in FIG. 13. The joining robot includes a pivot frame 36 at a front end of the robot arm 35. The pivot frame 36 has an inverted U-shape in front view. The pivot frame 36 includes suction pads 37 on both ends thereof. Here, plural pivot frames 36 are disposed in parallel for holding the substrate T horizontally. The robot arm 35 includes a joining roller 39 at a rod tip of a cylinder 38. The cylinder 38 is fixedly disposed at the tip end of the robot arm 35.

Description will be given to a series of operation by the joining robot to join the substrate T to the resin G applied to the workpiece W with reference to FIGS. 14 to 17.

Figure 14:
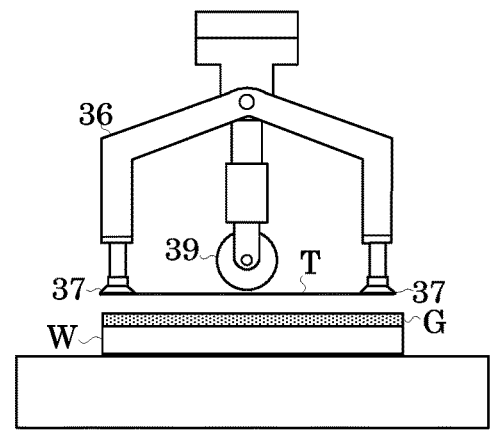
FIGS. 14 to 17 each illustrate joining of a substrate with the joining robot.
Figure 15:
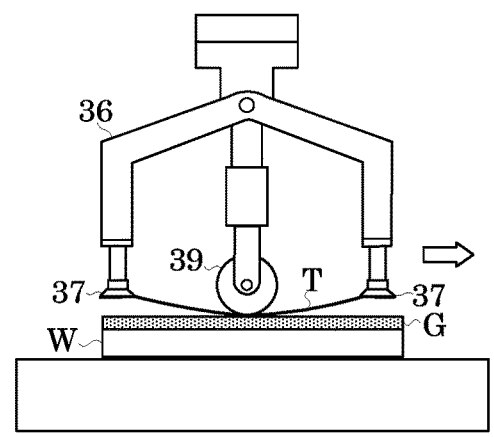

A workpiece W having the resin G applied thereto is held on a holding table 1A. The suction pads 37 at the tip ends of the pivot frame suction-hold both ends of the substrate T, and transports the substrate T to the workpiece W. Here, the substrate T is pre-cut by a length of the joining portion of the workpiece W disposed at a predetermined storage position. As illustrated in FIG. 14, the substrate T approaches the resin G while being kept parallel. Then, as illustrated in FIG. 15, the joining roller 39 moves downwardly. At this time, a center portion of the substrate T pressed by the joining roller 39 is joined to a center portion of the resin G.

Figure 16:
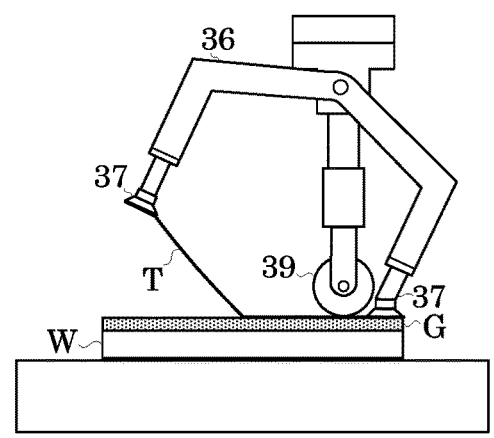

Thereafter, as illustrated in FIG. 16, the robot arm 35 operates to cause the joining roller 39 to join the substrate T to the resin G from the center portion to a first end of the resin G. Since the pivot frame 36 swings around a support shaft thereof at this time, the joining roller 39 presses and joins the substrate to the resin G while a level of the joining roller 39 moving toward the first end to the center portion of the resin G along with the swing of the pivot frame 36.

When the joining roller 39 moves to a first suction pad, the first end of the substrate is pressed by the first suction pad 38 biased downwardly by an elastic element, such as a spring, to be joined to the resin G. When finishing joining of the substrate T to the first end, the first suction pad 38 releases suction of the substrate T.

Figure 17:
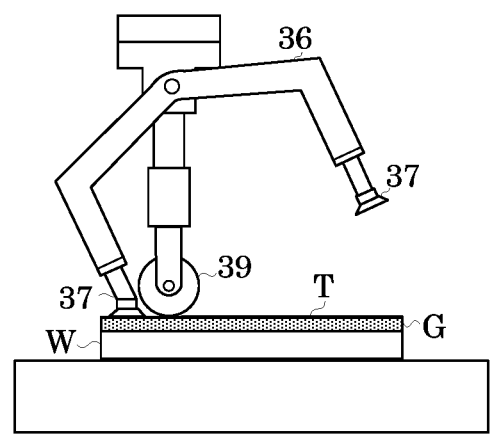

Next, as illustrated in FIG. 17, the robot arm 35 operates to cause the joining roller 39 to move to a second end of the resin G to join the substrate T to the resin G. During this joining step, the pivot frame 36 swings in the reverse direction around the support shaft. When the joining roller 39 moves to a second suction pad 37 at the second end of the resin G, a second end of the substrate T is pressed by the second suction pad 37, whereby the joining step is completed. When finishing joining of the substrate T to the second end, the second suction pad 37 releases suction of the substrate T. The robot arm 35 moves to take another substrate T for preparing a subsequent joining step. A series of operation of the apparatus in the embodiment is completed in such a manner as above.

(5) The following configuration is also applicable. That is, the coating mechanism 2, the joining mechanism 4, and the cutting mechanism 5 in the primary embodiment and the modifications (1) to (4) are disposed at the tip end of the robot arm to join the resin to the joining portion of the workpiece on the fixed holding table and thereafter to join the substrate to the resin.

(6) In each of the embodiment mentioned above, the plural substrate Ts, R are joined in parallel to the resin G. Alternatively, the substrates T may be joined in an intersecting manner. Moreover, the substrates may be joined in line and row in accordance with the shape of the joining portion. In this case, the holding table may, for example, move forwardly/backwardly or horizontally and rotate.

REFERENCE SIGNS LIST

1 . . . holding table
2 . . . coating mechanism
3 . . . substrate supplying unit
4 . . . joining mechanism
5 . . . cutting mechanism
10 . . . die coater
15 . . . joining roller
16 . . . nip roller
17 . . . cutter
G . . . resin
T, Ts, R . . . substrate

The invention claimed is:

1. An adhesive sheet joining method for joining an adhesive sheet to a workpiece, the method comprising:
    a coating step of applying an adhesive resin having a predetermined width to the workpiece by a coating member; and
    a joining step of joining a reinforcing substrate to the resin applied to the workpiece by a joining member to form the adhesive sheet, wherein
    in the joining step, a single strip substrate or plural strip substrates having a width smaller than the width of the resin are joined to the resin by a joining roller as the joining member.

2. The adhesive sheet joining method according to claim 1, wherein
    in the joining step, a substrate pre-cut by a length of the resin is transported and joined to the resin applied to the workpiece.

3. The adhesive sheet joining method according to claim 1, wherein
    in the coating step, the resin having the predetermined width is blown from a nozzle as the coating member to apply the resin to the workpiece.

4. An adhesive sheet joining method for joining an adhesive sheet to a workpiece, the method comprising:
    a coating step of applying an adhesive resin having a predetermined width to the workpiece by a coating member; and
    a joining step of joining a reinforcing substrate to the resin applied to the workpiece by a joining member to form the adhesive sheet, wherein
    in the joining step, a single strip substrate or plural strip substrates having a width smaller than the width of the resin are placed on the resin, and a nozzle as the joining member sprays gas to the substrate or the substrates to join the substrate or the substrates to the resin.

5. An adhesive sheet joining method for joining an adhesive sheet to a workpiece, the method comprising:
    a coating step of applying an adhesive resin having a predetermined width to the workpiece by a coating member; and
    a joining step of joining a reinforcing substrate to the resin applied to the workpiece by a joining member to form the adhesive sheet, wherein
    in the joining step, roving substrates placed on the resin at given intervals are joined to the resin while a nozzle as the joining member sprays gas.

6. The adhesive sheet joining method according to claim 5 wherein
    in the coating step, a thickness of the resin applied to the workpiece is adjusted to form a plurality of recesses in a coating direction, and
    in the joining step, the substrate is placed on the recesses formed on a surface of the resin to join the substrate to the resin.

7. An adhesive sheet joining apparatus for joining an adhesive sheet to a workpiece, the apparatus comprising:
    a coating mechanism applying an adhesive resin having a predetermined width to the workpiece by a coating member;
    a substrate supplying unit supplying a reinforcing substrate whose width is smaller than the width of the resin applied to the workpiece; and a joining mechanism joining while pressing the substrate to the resin by a joining member.

8. The adhesive sheet joining apparatus according to claim 7, further comprising:
    an additional holding table that holds the workpiece placed thereon.

9. The adhesive sheet joining apparatus according to claim 7, wherein
    the supplying unit supplies a single substrate or plural substrates, and
    the joining member is a joining roller that presses the substrate or the substrates against the resin.

10. The adhesive sheet joining apparatus according to claim 9, wherein
    when the substrate is plural roving substrates, the joining roller has plural guide grooves provided on a peripheral side face thereof for pressing and joining the substrates to the resin while guiding the substrates.

11. The adhesive sheet joining apparatus according to claim 10, further comprising:
    a controller forming a plurality of recesses on a surface of the resin in a coating direction while controlling an amount of the resin to be applied from the coating member in a width direction of the workpiece on a coating line, wherein
    the joining roller includes guide grooves on a peripheral side face thereof for inserting and pressing the roving substrates into and against the recesses on the surface of the resin while guiding the substrates.

12. The adhesive sheet joining apparatus according to claim 7, wherein
    the supplying unit supplies a single substrate or plural substrates, and
    the joining member is a nozzle that joins the resin to the substrate or the substrates while spraying gas to the substrate or the substrates.

13. The adhesive sheet joining apparatus according to claim 12, further comprising:
    a guide roller placing a roving substrates on the resin while guiding the substrates on guide grooves formed on a peripheral side face of the guide roller.

14. The adhesive sheet joining apparatus according to claim 13, further comprising:
    a controller forming a plurality of recesses on a surface of the resin in a coating direction while controlling an amount of the resin to be applied from the coating member in a width direction of the workpiece on a coating line, wherein
    the guide roller guides the roving substrates to the recesses on the surface of the resin.

15. The adhesive sheet joining apparatus according to claim 7, wherein
    the substrate supplying unit transports a substrate pre-cut by a length of the resin to the resin applied to the workpiece.

16. The adhesive sheet joining apparatus according to claim 7, wherein
    the coating member is a die coater that applies the resin from a slit to the workpiece by a predetermined width.

17. The adhesive sheet joining apparatus according to claim 7, wherein
    the coating member is a nozzle that applies an adhesive resin to the workpiece having a predetermined width.

* * * * *